July 16, 1968 TAKAYUKI YANAGAWA 3,392,440

SCRIBING METHOD FOR SEMICONDUCTOR WAFERS

Filed April 27, 1966

INVENTOR.
TAKAYUKI YANAGAWA

BY

Hopgood & Calimafde
ATTORNEYS.

United States Patent Office 3,392,440

Patented July 16, 1968

3,392,440

SCRIBING METHOD FOR SEMICONDUCTOR WAFERS

Takayuki Yanagawa, Tokyo, Japan, assignor to Nippon Electric Company, Limited, Tokyo, Japan, a corporation of Japan Filed Apr. 27, 1966, Ser. No. 545,636
Claims priority, application Japan, Apr. 30, 1965, 40/25,757
4 Claims. (Cl. 29—578)

This invention relates generally to cutting and scribing techniques for semiconductor materials and more particularly to a new and improved method for dicing a semiconductor wafer into individual semiconductor pellets of desired geometrical configuration.

In the manufacture of mesa or planar type semiconductors devices, it has been a common practice to utilize "batch" production wherein a large number of generally similarly configurated devices are formed simultaneously within a single semiconductor slice or wafer. The semiconductor slices are normally subjected to a scoring process commonly referred to as scribing, so that they may subsequently be broken into individual semiconductor devices. The scribing and breaking process generally consists in scoring or scribing two groups of orthogonal parallel lines to bound regions which lines are collectively and individually preferably fine, definite, and homogeneous. A suitable force is applied to the scribing point, which is greater in hardness than the semiconductor material (the point may, for example, be a conical diamond with a semi-spherical end of the order of tens of microns in radius) so that the application of a breaking force by suitable means such as warping the slice will result in a cleavage along the scribed lines. In other words, the principles underlying the scribing and breaking operation are similar to those carried out by a glass cutter.

In cases where the scribing region, at least on the wafer surface, is covered with a protective film such as silicon dioxide ($SiO_2$), harder than the semiconductor material (as in the manufacture of planar type semiconductor devices), the hardness of the scribing point must of course be greater than that of the protective film. Accordingly, the removal of the protective film to facilitate scribing was a frequently resorted-to technique in such cases. Regardless of whether the protective film is scribed or the semiconductor surface is directly scribed, the conventional scribing method has disadvantages which will be discussed hereinafter.

The point of an initially semispherical or conical scribing tool tends to wear or break into respectively a flat-bottomed or an excessively pointed shape after the scribing of, say, ten or more silicon wafers. Further, since the optimum value of the static load to be applied to the scribe is governed by many factors, including the kind and thicknesses of the semiconductor slice, the hardness and radius of curvature of the scribing point, this value had to be determined experimentally. Under ideal conditions, in which the scribing point is of the discussed optimum shape, the static load is the most appropriate, and the axis of the scribe is inclined at an angle of 70 to 80 degrees, with respect to the wafer surface, it is possible to mark a continuous, homogeneous, and fine line on the wafer surface without loss of material upon breaking. If the ideal conditions are deviated from or the contour of a wafer is rough or irregular, then microcracks tend to develop along the scribed line in a direction transverse to the direction of the line. These microcracks follow the scribing point and cause cracking or spalling of the surface material in the form of powder or flakes.

Once such microcracks develop, the scribing point tends to vibrate up and down and becomes the cause of inducing contagious microcracks. It may be said, therefore, that another defect in the conventional scribing method is the damage which arises because of the inherent high brittleness of the semiconductor material. A rigorous quality control for the uniform geometry of scribing points and a careful adjustment of the static load applied to the scribe to prevent such defective scribing is not a satisfactory solution for the reasons which follow. Securing the same geometry for a plurality of scribe points is almost impossible; the point itself is subject to deformation in usage; the optimum static load to be applied to the scribe cannot be determined theoretically prior to scribing, since it varies markedly with the contour, thickness, and other factors of the wafer. In fact, when the contour of a wafer is irregular, it is almost impossible to prevent damage. Should active semiconductor regions (such as the p-n junction) happen to be in such damaged areas, it is evident that performance of those semiconductor devices is seriously degraded or destroyed.

Generally speaking, the maximum width of damaged regions on the semiconductor wafer surface determines the minimum distance that can be tolerated between two adjacent semiconductor devices formed in the wafer or the maximum number of devices that can be accommodated by the wafer. Needless to say, even if the occurrence of slightly damaged regions is tolerated, it is still desirable that the widths of microcracks be kept as small as possible.

Accordingly, it is the object of this invention to provide a novel method for scribing semiconductor wafers which will minimize the occurrence and size of microcracks even in cases where the ideal conditions are not met or the contour of a wafer is irregular.

It is another object of this invention to provide a scribing method for semiconductor wafers that is most adaptable to scribing—that is, which identifies the scribing region and hence enhances the mass-production of semiconductor devices.

It is a feature of this invention to mask at least the scribing region on the wafer surface with a material in film form having a suitable hardness and viscosity. By the term "suitable hardness" is meant an appropriate hardness lower than the hardness of the semiconductor material, protective film material, or scribe point. The term "suitable viscosity" means an appropriate viscosity greater than that of the semiconductor material and/or the protective film, but not so large as to be caught or collected by the scribe point during its travel. Other qualifications for the masking material are an ease in removal after the completion of the scribing operation such that the performance of each pellet is substantially unimpaired and the securing of an optimum performance of each pellet if the masking material is retained on the pellet surface.

It is theorized that the masking method of the invention achieves favorable results because: it serves as a lubricant for the movement of the scribe point; it is a shock-absorber for excessive loads that may be applied on the scribe point or excessive vertical movements of the scribe point; and it prevents microcracks, once produced from developing into larger cracks, because the viscosity of the masking material suppresses the expansion of the cracks. Waxes as well as metals such as gold and aluminum have been found satisfactory for use as the masking material, but masking materials are by no means to be restricted to these substances. Any other substances which provide the foregoing advantages and have the functional requisites to be described will suffice.

The above mentioned and other features and objects of this invention and the manner of attaining them will become more apparent and the invention itself will best be understood by reference to the following description of embodiments of the invention taken in conjunction with the accompanying drawings wherein.

Figure 1:
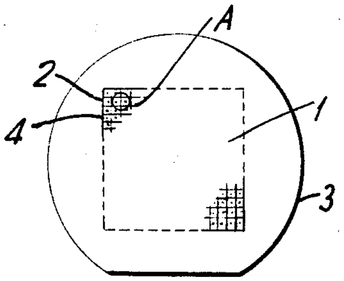
FIG. 1 is a plan view of a semiconductor wafer containing a large number of planar type transistors.

In the first embodiment of this invention (not shown in the figures) a wax is used as the masking material. Generally speaking, a suitable wax for masking should preferably be soluble in a volatile solvent. Among the various waxes meeting this requirement are "Apiezon Wax" (trade name of a product developed by Associated Electrical Industries, England) which is soluble in trichloroethylene, and "Electron Wax" (trade name of a product developed by Mune Electronic Industries, Japan) which is soluble in ethyl alcohol as well as in trichloroethylene.

A solution is first prepared by dissolving Apiezon wax in paste form into trichloroethylene at the rate of 1 g. to 20 cc. The semiconductor wafer to be scribed is then immersed and immediately removed from the solution. The wet wafer is placed level on a base plate (preferably of a resilient material) with the scribing surface upward. Left standing in air, the trichloroethylene is evaporated and the wafer is thus masked with a uniform wax film, approximately 5 microns in thickness. At the same time, the wafer is securely bonded to the base plate by the action of the wax. After scribing the wafer surface by the known conventional method, the scribed wafer is broken into individual devices by warping the base plate. The wafer is subsequently dipped into trichloroethylene to remove the wax from semiconductor devices. Damage to the surface of the wafer scribed by this method was found to be extremely small and the pellet yields were greatly improved.

It has been found that although the wax film thickness may be arbitrarily chosen, it should preferably be less than 10 microns so that the wafer surface is clearly visible and the scribing region can easily be identified through the wax film. There is no particular objection to providing the wax film on only one surface of the wafer, but the filming of both sufaces simultaneously has been found to be advantageous in that the wax can be used as a binding agent to the base plate.

The method for masking a wafer with a wax film is, however, by no means restricted to the dipping process; any other suitable method (such as spraying) may be adopted. In this embodiment, it has been assumed that no protective film such as silicon dioxide is present on the wafer surface, but equivalent effects can be achieved by the same method if a protective film is present.

Masking solely the scribing region (a meshwork comprising two families of generally orthogonal scribe channels and a region along these channels in proximity thereto) or the entire wafer surface with a metallic film has been found to be effective.

A suitable masking method for metal may be achieved by vacuum evaporation, spattering, or stencil plating. The metallic film to be scribed is normally placed on the scribing region only instead of masking the entire surface. The metallic film may be directly formed on the semiconductor material or may be formed on the protective film. In cases where removal of the metallic film from the wafer surface is necessary, any suitable publicly known process such as chemical etching or electrolytic etching may be utilized. The masking metal should have the attributes of a low hardness and high viscosity; examples are aluminum and gold. The formation of the scribing metallic film on the scribing region simultaneously with the metalization of the device's electrodes by use of a single metal is a convenient method. An embodiment using this latter method will now be described in conjunction with the accompanying drawings.

Figure 2:
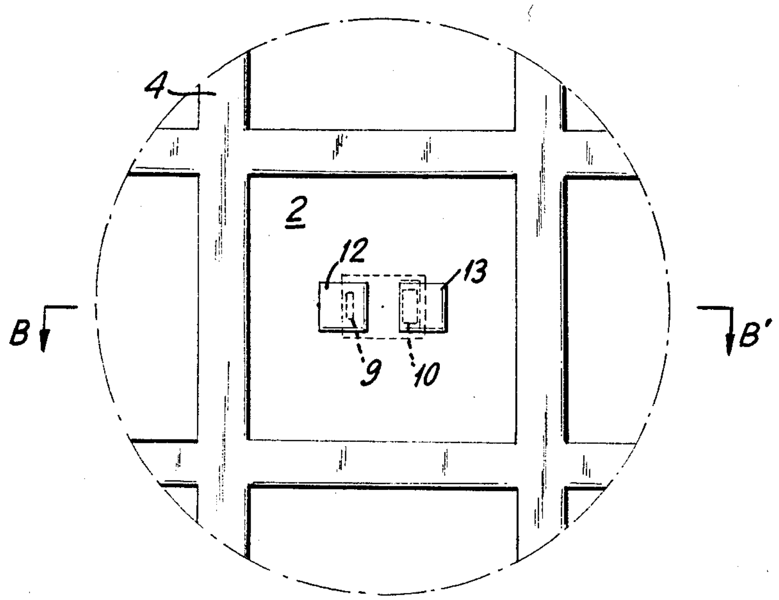
FIG. 2 is a magnified plan view of the part of FIG. 1 designated A.
Figure 3:
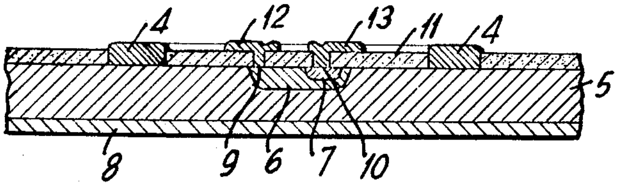
FIG. 3 is a cross sectional view of FIG. 2 along line B–B'.

FIGS. 1 through 3 are schematic illustrations of the structure of a silicon wafer prior to scribing operation in the manufacturing process of planar type silicon transistors. Referring to FIG. 1, the silicon wafer 3 is circular, approximately 25 millimeters in diameter and 0.2 millimeter in thickness, and comprises an inner zone 1 including a large number of contiguous, similar, planar type transistors 2 arranged in an array. The shown meshwork corresponds to the previously mentioned "scribing region." The scribing region (which, it is to be remembered, is of linear traces) is masked with metallic film 4 by any suitable method such as the well known stenciling or photomasking technique as will be mentioned. While the inner zone 1 includes a large number of silicon transistors, the majority of these transistors have been omitted for simplicity and a dashed line used to indicate the outer geometry of the assembly.

The structure of each planar type transistor pellet, shown schematically in the plan view of FIG. 2 and in the cross-sectional view of FIG. 3, can be realized by the successive steps (a) through (d) as follows:

(a) The opposite surfaces of a silicon slice or wafer in which collector region 5, base region 6, and emitter region 7 have been formed by the conventional diffusing technique are covered with silicon dioxide film 11.

(b) The silicon dioxide film 11 on regions 8, 9, and 10 (on which the collector, base, and emitter electrodes are to be installed) as well as on the scribing region is removed by any well known method.

(c) Aluminum is coated over the entire upper surface of the wafer 3 in a thickness of the order of 1 micron by vacuum evaporation.

(d) The aluminum covered wafer is subjected to a known photomasking or photoetching technique using a glass mask. That is, photosensitive organic compound films are caused to be retained on the aluminum film corresponding to the base, emitter electrodes, and scribing regions. Then, by dipping the aluminum-coated wafer into a 10 percent caustic soda solution, all exposed aluminum film is etched off.

Thus a silicon wafer as illustrated schematically in a cross sectional view of FIG. 3 is realized, and the base electrode 12, the emitter electrode 13, and the scribing film 4 are all formed simultaneously in the form of an aluminum film of a thickness of the order of 1 micron. Thereafter the photosensitive organic compound retained on the electrodes as well as on the scribing region should be removed by a suitable method. The scribing film 4 is then scribed with the scribing point and the scribed wafer is broken and diced into individual pellets. The aluminum film retained on yellets need not be removed.

There is also no objection to masking the scribing region with aluminum film 4 without removing the silicon dioxide film covering the scribing region. Further, the method of providing the scribing film 4 should by no means be construed as restricted to the one used in this embodiment; evaporation of aluminum onto the scribing region by use of a metal stencil is another example.

This embodiment of the invention is characterized by the ease of scribing and the suppression of the occurrence of microcracks in the wafer due to scribing. Another feature of this embodiment is that the formation of the scribe film does not change the fabrication process. For example, when a stencil is used, the provision of extra perforations is the stencil (in which the electrode pattern has already been perforated) for the scribe regions is all that is needed. Still another feature of this embodiment is that scribing film 4 need not be removed. In other words, the manufacturing process is not complicated by the additional aluminum deposits.

An added advantage to this method is the rapidity with which scribing can be initiated, because the scribing region is easily discerned due to the presence of a metallic film in the scribe region; without the necessity of controlling the direction of the light source as in the conventional scribing operation. In other words, since the surface of a planar type semiconductor slice produced according to the batch production technique has a mirror-like lustre, it is difficult to perceive the scribing region on the slice under a microscope if the direction of irradiation from a light source is not controlled properly. In the presence of such an aluminum film, however, the region can be readily discerned, without regard to the direction in which the wafer is irradiated, because irregularities on the surface of the aluminum film causes the light to be reflected in all directions. This contributes greatly to decreasing errors in the scribing operation, thereby improving the yield rate.

Another incidential advantage of this embodiment is as follows. Conventionally, the photomasking process using a photosensitive organic compound and the electrolytic etching process were combined in forming metallic film electrodes of the prescribed geometry on semiconductor wafers. This conventional method comprises the steps of: coating the entire surface of a semiconductor wafer with a metallic film by suitable process such as vacuum evaporation; masking the metallic film corresponding to the prescribed electrode pattern to be left with a photosensitive organic compound; bonding an electrode to the exposed metallic film portion; and immersing the wafer into an electrolyte for subjecting the wafer to an electrolytic etching process, by applying a voltage across one electrode as the cathode and the other electrode as the anode, to remove the unmasked portion of the metallic film and retain the masked portion of the metallic film in the prescribed pattern. With this method, the metallic film as one of the electrodes is etched off gradually. Since the progress of the electrolysis tends to become inevitably non-uniform, a metallic film part isolated from the electrode will remain unremoved.

In contrast, with the method according to the invention, a meshwork of metallic film exists with a retained photosensitive organic compound in the boundary region of the individual semiconductor devices and the electrolysis takes place uniformly without the possibility of any isolated metallic film zone being left. Thus it may be seen that by employing any one of the methods that have been mentioned in conjunction with the two embodiments of this invention, the scribe damage can be minimized, even if the geometry of the scribing point is not optimum; the optimum static load applied to the scribe point is deviated from; or the contour of a wafer is rough or irregular. Further, since adjacent semiconductor devices in a wafer can be more proximate without scribe damage, the semiconductor yield per wafer and cost is markedly improved.

Although the foregoing description has been limited to the manufacture of planar type transistors, it will be evident that the scribing method according to this invention is by no means to be restricted to this type. It may be equally applied to the manufacture of general semiconductor devices such as diodes or mesa type transistors or integrated semiconductor circuits. Further, while the description has been relegated to a new and improved scribing method in which semiconductor devices are produced by "batch" production, it should clearly be understood that this scribing method can also find application in scribing all kinds of semiconductor wafers, such as unprocessed or crude wafers, into smaller wafers of desired geometrical configurations.

While the principles of the invention have been described in connection with specific apparatus, it is to be clearly understood that this description is made only by way of example and not as a limitation to the scope of the invention as set forth in the objects thereof and in the accompanying claims.

I claim:

1. In the process of producing individual semiconductor pieces from a larger semiconductor wafer by scribing and separating the scribe bounded regions, the improvement comprising the step of: thin film masking at least the region to be scribed with a wax material having a lesser hardness and larger viscosity than the semiconductor material, and scribing through said film.

2. The improvement claimed in claim 1 in which the film covers at least one wafer surface.

3. The improvement claimed in claim 1 further comprising the step of removing the wax after the scribing.

4. In the process of producing individual semiconductor pieces from a larger semiconductor wafer having a protective film by scribing and separating the scribe bounded regions, the improvement comprising the step of: thin film masking at least the region to be scribed with a material having a lesser hardness and larger viscosity than the material of said protective film, and scribing through said thin film.

References Cited

UNITED STATES PATENTS

| | | | |
|---|---|---|---|
| 3,040,489 | 6/1962 | Dacosta | 225—2 X |
| 3,165,430 | 1/1965 | Hugle | 148—187 |
| 3,206,088 | 9/1965 | Meyer et al. | 225—2 |
| 3,364,399 | 1/1968 | Warner | 317—235 |

WILLIAM I. BROOKS, *Primary Examiner.*